(12) United States Patent
Ramzan et al.

(10) Patent No.: US 10,222,270 B2
(45) Date of Patent: Mar. 5, 2019

(54) TEMPERATURE MONITORING OF SUBJECT BODIES USING WIRELESS ENERGY TRANSFER

(71) Applicant: United Arab Emirates University, Al Ain (AE)

(72) Inventors: Rashad Ramzan, Al Ain (AE); Azam Beg, Al Ain (AE); Nabil Bastaki, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 716 days.

(21) Appl. No.: 14/695,713

(22) Filed: Apr. 24, 2015

(65) Prior Publication Data

US 2016/0313188 A1   Oct. 27, 2016

(51) Int. Cl.
*G01K 1/02*   (2006.01)
*G01K 7/32*   (2006.01)

(52) U.S. Cl.
CPC .............. *G01K 1/024* (2013.01); *G01K 1/026* (2013.01); *G01K 7/32* (2013.01)

(58) Field of Classification Search
CPC   G01K 7/02; G01K 3/005; G01K 3/10; G01K 7/42; G01K 7/22; G01K 2205/04; G01K 7/16; G01K 7/01; G01K 7/10; G01K 11/32; G01K 13/00; G01K 13/02; G01K 2013/024; H01R 4/023; H01R 4/029; H01R 43/28; B23K 31/02; H05K 7/20945; F24F 11/0012; F24F 2001/0052; F24F 2011/0093; F24F 11/022; H02M 1/32;

(Continued)

(56) References Cited

U.S. PATENT DOCUMENTS 4,650,346 A * 3/1987 Tehon .................... G01K 11/26
                                                        374/117
5,682,149 A * 10/1997 Hofman ................. G01K 1/024
                                                        374/E1.004

(Continued)

FOREIGN PATENT DOCUMENTS

EP    2 435 339 A1    4/2012
EP    2 642 436 A1    9/2013

(Continued)

*Primary Examiner* — Manish S Shah
(74) *Attorney, Agent, or Firm* — Hayes Soloway PC

(57) ABSTRACT

Provided is a system for monitoring temperature of one or more subject bodies, the system including a resonant reading circuit adapted to generate resonant wireless power loads; a resonant receiver circuit adapted to be magnetically connected to the resonant reading circuit for receiving the resonant wireless power loads and for generating power based on the power loads received; one or more temperature sensors adapted to be operatively connected to the resonant receiver circuit for deriving power and for measuring the temperatures of the one or more subject bodies respectively based on the resonant wireless power loads received; and a relay circuit adapted to be operatively connected to the one or more temperature sensors and to the resonant receiver circuit for relaying the measured temperatures to the resonant reading circuit via the resonant receiver circuit using wireless resonant energy transfer. There is further provided a temperature-sensing device and a storage apparatus.

21 Claims, 3 Drawing Sheets

(58) Field of Classification Search
CPC .... H02M 1/38; H02M 1/53806; H01C 7/008; H01C 1/14; H01C 17/00; G01N 25/72; G01N 25/28; G01N 25/32; G01N 33/225; G01N 33/02; G01R 31/2642; G01R 31/048; G01R 31/40; G01J 5/004; G01J 5/043; G01J 5/0821; A47J 43/287; F16B 2/02; F16B 1/00; F16B 47/00; F16B 2001/0035; F16M 13/02; F16M 13/022
See application file for complete search history.

(56) References Cited

U.S. PATENT DOCUMENTS

| | | | |
|---|---|---|---|
| 6,107,924 A * | 8/2000 | Kasai | H03K 17/954 340/627 |
| 6,249,212 B1 | 6/2001 | Beigel et al. | |
| 6,677,859 B1 * | 1/2004 | Bensen | A61F 5/48 340/552 |
| 6,798,219 B2 | 9/2004 | Lamothe | |
| 6,950,028 B2 | 9/2005 | Zweig | |
| 7,564,364 B2 | 7/2009 | Zweig | |
| 8,151,599 B2 | 4/2012 | Sixt | |
| 8,154,421 B2 | 4/2012 | Saltzman et al. | |
| 8,332,240 B1 | 12/2012 | Garver et al. | |
| 2005/0248455 A1 | 11/2005 | Pope et al. | |
| 2008/0272131 A1 | 11/2008 | Roberts et al. | |
| 2010/0021993 A1 | 1/2010 | Wang et al. | |
| 2010/0170352 A1 | 7/2010 | Petersen et al. | |
| 2013/0020309 A1 | 1/2013 | Tattam et al. | |
| 2013/0316442 A1 | 11/2013 | Meurville et al. | |

FOREIGN PATENT DOCUMENTS

| | | |
|---|---|---|
| WO | WO 2005/106813 A2 | 11/2005 |
| WO | WO 2008/137409 A1 | 11/2008 |
| WO | WO 2010/136771 A1 | 12/2010 |

* cited by examiner

TEMPERATURE MONITORING OF SUBJECT BODIES USING WIRELESS ENERGY TRANSFER

FIELD OF THE DISCLOSURE

The present disclosure generally relates to an electronic method and system for sensing and monitoring the temperature of subject bodies, and particularly to a temperature monitoring apparatus and system for sensing and monitoring temperature of vaccines.

BACKGROUND OF THE DISCLOSURE

Use of vaccine to control and prevent the disease is a vital part of modern human life. However, due to inefficiencies in storage and transport renders a significant percentage of these valuable vaccines ineffective resulting in huge losses in terms of human health and money.

According to a recent meta-analysis published in the journal Vaccine that included studies published in more than 20 countries, it is estimated that a whopping 14 percent (%) to 35% of vaccines are damaged due to temperature excursions beyond the recommended limits during transportation or storage. Such losses can easily translate into thousands of lost human lives and hundreds of millions of dollars of losses due to ineffective treatment and the consequential medical costs.

Usually the technological art of detection of time-temperature indicators known so far can be categorized into three types. This first type (Type 1) uses a visual indicator based on chemical properties that closely match the Arrhenius degradation properties of given material. No equipment is needed to process the indicators. The user does not need to be highly skilled.

On the other hand, the second type (Type 2) relies on electronic circuitry to monitor and log the time-temperature history of the material in interest. Specialized reading equipment is required in this case, which means that the equipment is of larger sizes than Type 1 and the user of the equipment has to be specially trained for interpreting, monitoring and analysis of the data.

The third type (Type 3), although electronic in nature does not keep track of the full history of the temperature variations. In this type of equipment, the apparatus indicates the occurrence of a limited number of pre-determined temperature excursions (for example, the lowest temperature at time T1, medium temperature at time T2, and the like).

The deterioration of simple materials as per Type 1, can be approximated with the well-known Arrhenius equation: $K=C \cdot e^{(-E/(RT))}$. Here K=rate of deterioration, C is a constant, E is the activation energy of the reaction, R is the universal gas constant, and T is the temperature in Kelvin. However, there is a significant limitation. The complex materials (such as vaccines) are usually not sufficiently characterized by the above equation.

There have been some solutions developed in recent years for monitoring temperature of subject bodies or test materials. For example, in U.S. Pat. No. 6,249,212, there is described a temperature sensing system made from a variety of technologies, i.e., bipolar junction transistors and zener diodes (for voltage regulations), and CMOS (complementary metal-oxide semiconductor) circuits (for data processing and storage, and RF). However, these technologies are cumbersome, and most importantly, the technologies embodied cannot be integrated on a single chip. The electronic system described in the cited patent, due to its complexity, requires large source of power. Alternatively these electronic systems would use visible or infrared source of energy (solar cell) that cannot be integrated on a single chip, due to the use of a mix of technologies; thus the size of the electronic tag is larger and the cost is high.

Further, in U.S. Pat. No. 6,798,219, there is described a temperature monitoring system based on temperature-sensitive metallic mechanical switches (cantilever or bimetallic) or temperature memory alloy. When a pre-established temperature of the subject or target body is reached, the system permanently sets its state. A floating-avalanche MOS (FAMOS) transistor is used to store the state of the system. However, such a system does not store the history of the temperature excursions. The potential drawbacks of the system include higher manufacturing cost due to a combination of metal (made of Aluminum and Silicon, or temperature memory alloy) and electronic devices (Silicon). The disclosed systems may need special casing to isolate the temperature sensing mechanism from the liquid it is immersed in. This is a significant limitation, especially in case, where the subject bodies are vaccines.

Further, in U.S. Patent Application Publication 2010/0170352, there is disclosed a thermistor-based temperature sensing system. RF technology is used to read the temperature from the sensor. The sensor only sends out resistor values, so the calculations for determining the temperature are done using an external system, such as a personal computer (PC). The sensor itself is made of discrete components such as thermistor, related electronics, antenna, and casing. Again, the sensing system requires external power sources. The sensors are required to be placed inside a casing if the temperature of liquids is to be measured. The required casing for insulating the sensors, increases manufacturing cost. On the other hand, the temperature reading may not be as accurate because of the casing.

Further, in U.S. Pat. No. 6,950,028, describes a temperature monitor of electronic nature. It allows user to preprogram the exact thermal characteristics of the material being monitored as compared to the others who rely on simple exponential Arrhenius decay curve. Simple visual indications allow the users to quickly determine the health of the monitored material. This patent included the RFID equipment in the time-temperature scheme as disclosed in U.S. Pat. No. 7,564,364B2.

Further, in PCT Application Publication 2005/106813, describes a temperature monitoring system consisting of a perishable sensor and a RFID transponder to determine the current state of a monitored material state. The time-temperature properties of the material are stored in the memory of the module. The memory is used to lookup the freshness status of the material.

Further, in PCT Application Publication 2008/137409, describes an insulated container fitted with a RFID device which needs a temperature sensors and battery.

Further, in U.S. Pat. No. 8,151,599, describes a transport container for maintaining the material temperature, however does not cover any temperature reading and logging mechanisms.

Further, in U.S. Pat. No. 8,154,421, describes a container with built temperature and location tracking system. An electronic sensor is used for temperature measurement. The GPS components included within the container send out real time data using the cellular communication networks.

Further, in U.S. Patent Application Publication 2010/0021993, describes a method based on impedance measurement of a liquid/material that may not be safe for human to handle or may need to be identified without opening the liquid/material container. The sensor attached to the inside wall of the container has to be insulated from the liquid using a special method and materials. The sensor is attached to a resonant receiver antenna. This antenna is energized by an external transmitting resonant antenna which is coupled with a impedance measurement equipment. The material-sensitive impedance measurement is done by exposing the container to magnetic field.

Further, in U.S. Pat. No. 8,332,240, describes micro electromechanical system (MEMS) and RFID technology in their vaccine tracking monitoring and inventory system. The environmental monitoring tags are based on MEMS. The MEMS are costly as well as not very reliable. The U.S. Patent Application Publication 2013/0316442 suffers from the same drawback.

Further, in E.P. Patent Application Publication 2642436, describes a combination of RFID and wireless technologies.

Further, E.P Granted Patent Number 2435339 and U.S. Patent Application Publication 2013/020309, describe a container with maintained temperatures. The temperature sensing mechanism is based on a thermistor.

These prior art systems have drawbacks in that for example they either use electromagnetic waves which are attenuated by liquid, or require batteries which may cause chemical reactions with liquids and/or do not allow for the monitoring of the temperature fluctuations through time.

SUMMARY OF THE DISCLOSURE

As a first aspect of the invention, there is provided a temperature sensing device for measuring temperature of a subject body and relaying the measured temperature to a control device remote from the temperature sensing device. The temperature sensing device comprising a resonant receiver circuit is designed to receive resonant wireless power loads from the control device; a temperature sensor adapted to be operatively connected to the resonant receiver circuit for deriving power and for measuring the temperature of the subject body based on the resonant wireless power loads received; and a relay circuit is adapted to be operatively connected to the temperature sensor and to the resonant receiver circuit for relaying the measured temperature to the control device via the resonant receiver circuit using wireless resonant energy transfer.

Preferably, the relay circuit comprises an analog-to-digital convertor (ADC) and a load-switching circuit for relaying the detected temperature to the control device.

Preferably, the ADC is an ultra-low power high-resolution 1-bit ADC.

Preferably, the load switching circuit is adapted to load the resonant receiver circuit with different loads based on binary output of the analog-to-digital converter.

Preferably, the temperature sensor is a CMOS-based temperature sensor.

Preferably, the system further comprises a rectification circuit which is adapted to rectify and regulate the power derived from the resonant receiver circuit and provide the rectified power to the temperature sensor.

Preferably, the resonant receiver circuit comprises a resonant-clocking based digital logic and a memory.

Preferably, the device is an integrated circuit (IC) device having an area of less than 0.5 mm$^2$.

Preferably, the MOS-transistor temperature sensor has an outer layer comprising SiO$_2$.

As a second aspect of the invention, there is provided a system for monitoring temperature of one or more subject bodies, the system comprising a resonant reading circuit adapted to generate resonant wireless power loads; a resonant receiver circuit adapted to be magnetically connected to the resonant reading circuit for receiving the resonant wireless power loads and for generating power based on the power loads received; one or more temperature sensors adapted to be operatively connected to the resonant receiver circuit for deriving power and for measuring the temperatures of the one or more subject bodies respectively based on the resonant wireless power loads received; and a relay circuit adapted to be operatively connected to the one or more temperature sensors and to the resonant receiver circuit for relaying the measured temperatures to the resonant reading circuit via the resonant receiver circuit using wireless resonant energy transfer.

Preferably, the resonant reading circuit comprises a transceiver coil and a radio frequency data receiver circuit connected to the transmitter coil for generating data based on the wireless resonant energy received at the transceiver coil.

Preferably, the system further comprises a display adapted to be connected to radio frequency data receiver circuit for displaying the measured temperatures.

Preferably, the measured temperatures are associated with each one of the one or more subject bodies such that each subject body has at least one measured temperature.

Preferably, the system further comprises a DC power supply source adapted to be connected to the transceiver coil for powering transceiver coil.

Preferably, the relay circuit comprises an ADC and a load switching circuit, the ADC being an ultra-low power high resolution 1-bit ADC, and the system further comprises a rectification circuit adapted to rectify and regulate the power derived from the resonant receiver circuit and provide the rectified power to the one or more temperature sensors.

Preferably, the resonant receiver circuit, the one or more temperature sensors and the relay circuit are part of one or more ICs adapted to be in physical contact with the ore or more subject bodies respectively.

Preferably, the device has an area of less than 0.5 mm$^2$, the load switching circuit is adapted to load the resonant receiver circuit with different loads based on binary output of the ADC converter, and the temperature sensor is a CMOS based temperature sensor.

As another aspect of the invention, there is provided a storage apparatus comprising a container adapted to store one or more pharmaceutical products; the temperature monitoring system as claimed in claim 10; a cover having an internal portion adapted to receive the resonant reading circuit in such a manner that it is magnetically connected to the one or more temperature sensors; a display adapted to be coupled to the internal portion of the cover for displaying the one or more measured temperatures.

Preferably, the pharmaceutical products are vaccine bottles. Preferably, the resonant receiver circuit, the one or more temperature sensors and the relay circuit are part of one or more ICs adapted to be dipped inside the vaccine.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

BRIEF DESCRIPTION OF THE DRAWINGS

The advantages and features of the present disclosure will become better understood with reference to the following detailed description and claims taken in conjunction with the accompanying drawing, in which:

DETAILED DESCRIPTION OF THE DISCLOSURE

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated. The terms "a" and "an" herein do not denote a limitation of quantity, but rather denote the presence of at least one of the referenced item.

Figure 1:
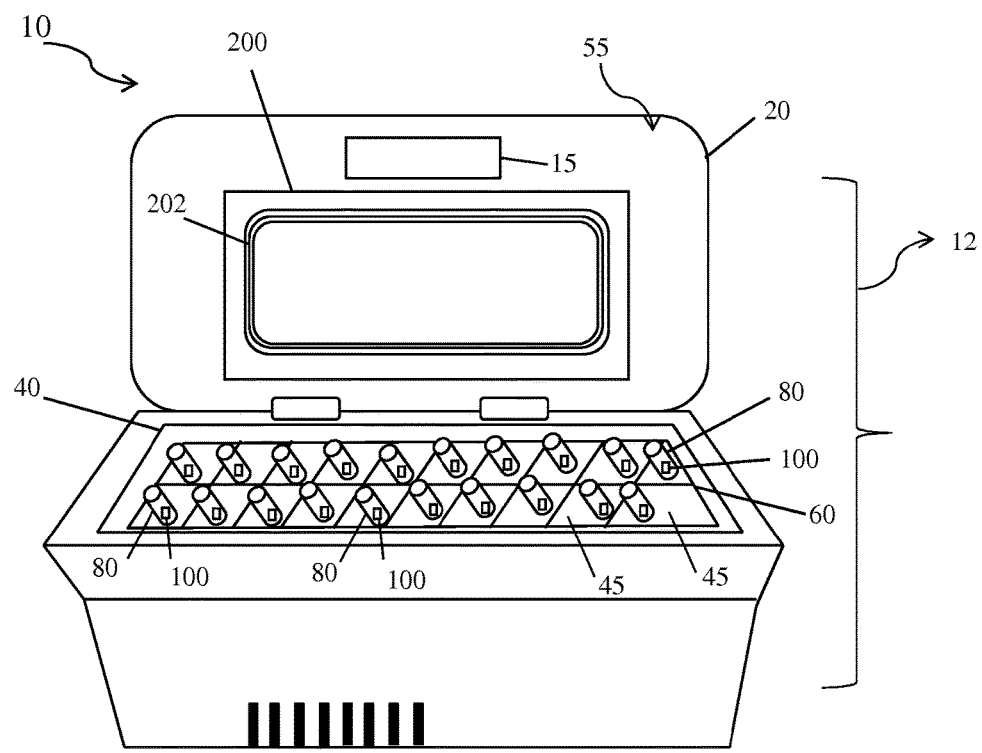
FIG. 1 illustrates a temperature monitoring apparatus for monitoring temperature of plurality of subject bodies placed within the apparatus in accordance with an embodiment of the present invention.
Figure 2:
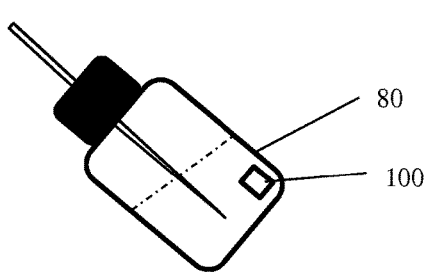
FIG. 2A illustrates use of the temperature-sensing device 100 with container based pharmaceutical products like vaccine bottles, medical solution containers or carriers in accordance with an embodiment of the present invention.
FIG. 2B illustrates use of the temperature-sensing device 100 with capsule based pharmaceutical products in accordance with an embodiment of the present invention.
Figure 2:
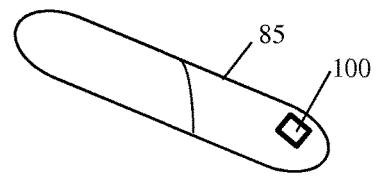
Figure 3:
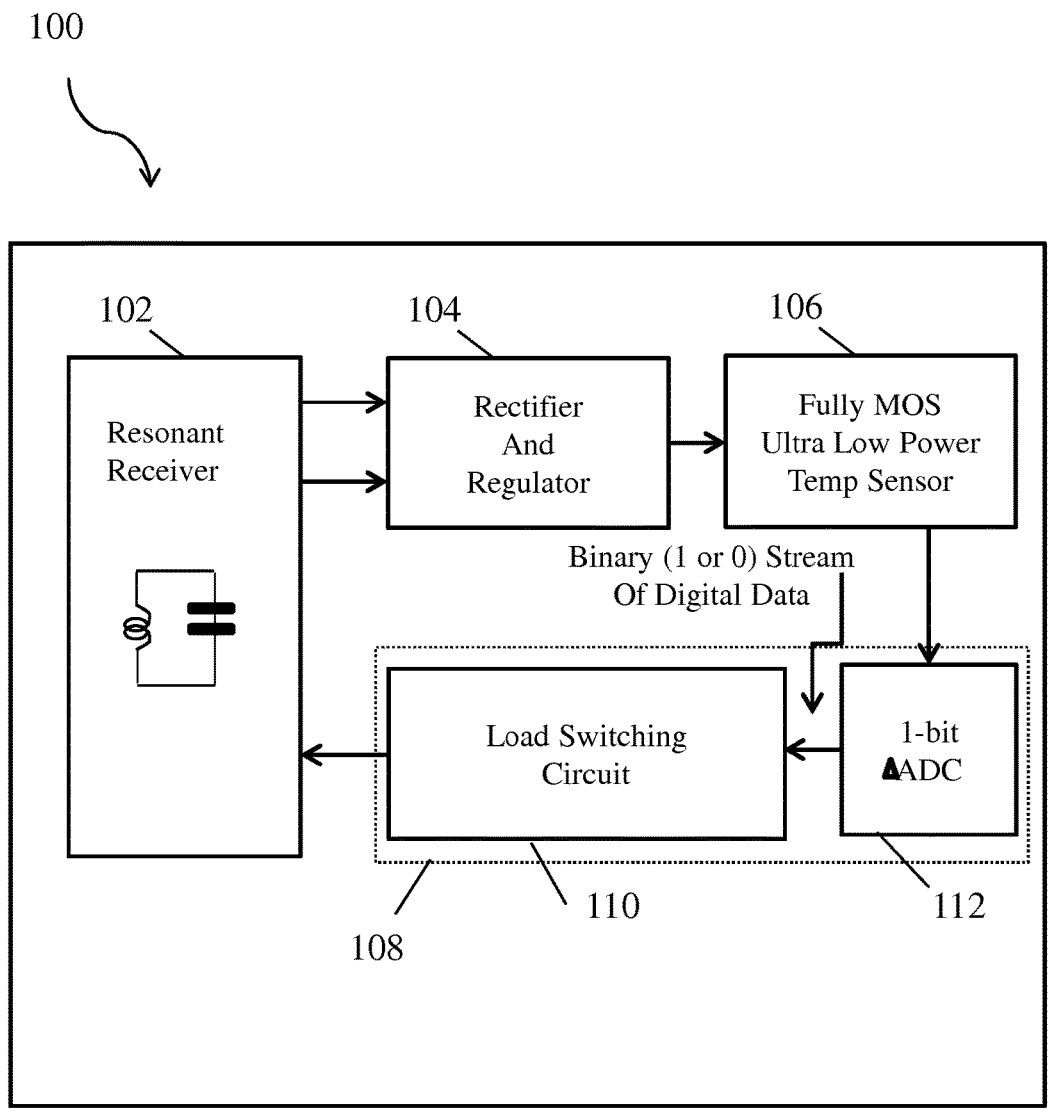
FIG. 3 illustrates a block diagram of a temperature sensing Integrated Circuit (IC) according to an embodiment of the present invention.

As a first aspect of the invention (see FIGS. 1-3), the present invention provides a temperature-sensing device 100 adapted to be in physical contact with a subject body 80 (for example, immersed in the vaccine when the subject body 80 is a vaccine) for detecting and reporting the temperature of the subject body 80 to a control device 200. The subject body can be any object requiring temperature monitoring including but not limited to food products, beverage products, and pharmaceutical products, such as pharmaceutical formulations or vaccines. The temperature-sensing device 100 is preferably an IC made of silicon glass adapted to avoid any chemical reaction when put in physical contact with the subject bodies. The temperature-sensing device 100 does not comprise a power supply. This is useful for minimizing the size of the temperature-sensing device 100 which makes it suitable for integration in small size bodies such as vaccines bottles. This is also useful for avoiding any chemical reaction between the power supply source and the subject body.

The temperature-sensing device 100 is adapted to draw power from an external power source, the control device 200 in this case, using the principle of resonant wireless energy transfer. The temperature-sensing device 100 is adapted to read the temperature of the subject body when a power load is received from the control device 200 and to send the detected temperature back to the control device 200 using the same principle of resonant wireless energy transfer. In this respect, both the temperature-sensing device 100 and the control device 200 comprise respective resonant circuits (102 and 202 respectively) adapted to use the principle of resonant wireless energy transfer there between. The resonant circuits 102 and 202 are resonant coils adapted to resonate to generate magnetic fluxes. The resonant coil 102 of the temperature-sensing device 100 is built on the IC device 100 in such a manner to receive the wireless energy from the resonant coil 202 of the control device 200 in the form of magnetic flux in a nano Watt scale. The terms resonant circuit and resonant coil are interchangeably used in this application which shall be interpreted to have the same meaning.

The temperature-sensing device 100 is therefore adapted to monitor the temperature of a subject body over time by reporting a series of temperatures related to the subject body at different time slots. The temperature-sensing device 100 is adapted to be triggered for reading the temperature of the subject body at the receipt of a power load from the control device 200, where the temperature reading is reported back to the control device 200 immediately using the principle of resonant wireless energy transfer without local storage inside the device 100. A temperature history record can therefore be created over time with the various temperature readings received from the temperature sensing device 100.

Figure 4:
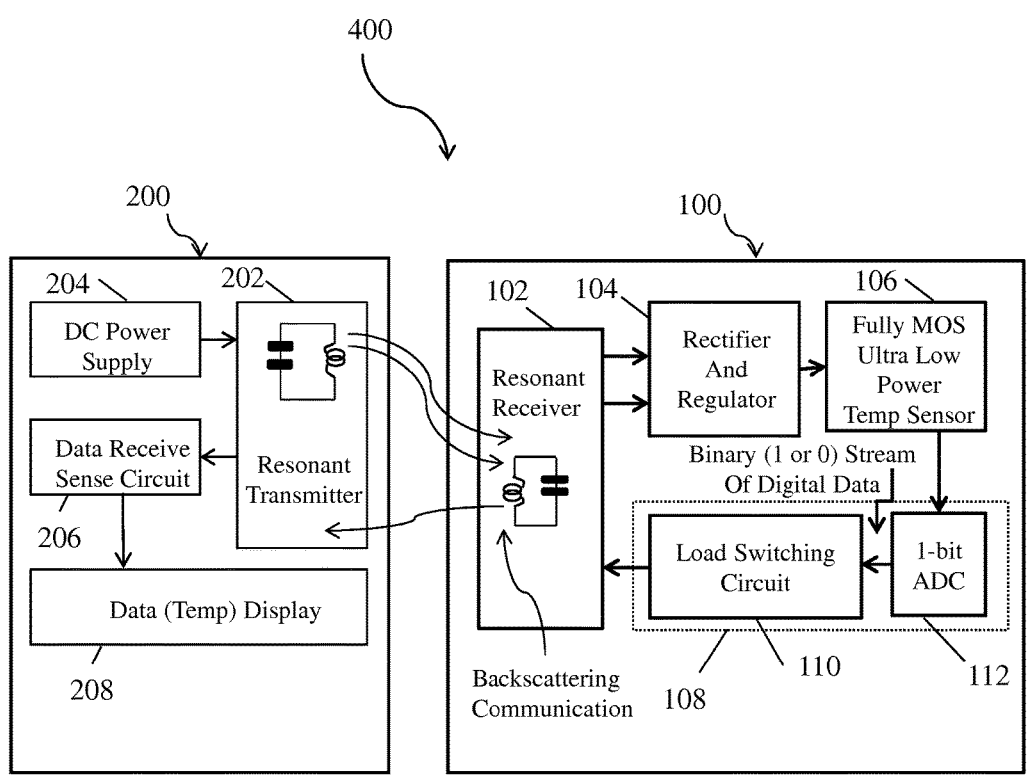
FIG. 4 illustrates a system for sensing temperature of one or more subject bodies, according to an embodiment of the present invention.

As a second aspect of the invention (see FIG. 4), the present invention provides a control device 200 adapted to be operatively connected to the temperature sensing device 100. The control device 200 is adapted to transfer power loads to the temperature sensing device 100 using the principle of resonant wireless energy transfer for triggering the operation of the temperature sensing device 100 therefore detecting the temperature of the subject body 80 and reporting the information back to the control device 200. The control device 200 is adapted to be physically distant from the subject body 80, however within a suitable distance range for enabling the transfer of resonant wireless energy with the temperature-sensing device 100. The power supply source can either be internal or external to the control device 200.

The control device 200 is not restricted to have a particular size, material or shape limited by the shape, size or chemical composition of the subject body 80. This is because the control device 200 is external to the subject body 80 and not in physical contact therewith. The control device 200 is adapted to receive power loads representing the temperature readings from the temperature-sensing device 100 using resonant wireless energy and to process the power loads received for decoding the temperature readings.

The temperature readings are then stored inside a memory and/or communicated to a user interface such as a display for example either internal or external to the control device 200 based on the requirements of the application. The series of temperatures received over time in connection with the subject body 80 can constitute a temperature history record of the subject body 80 which can be used to assess against any validity requirements of the subject body 80.

As a further aspect of the invention (see FIGS. 1-2), there is provided a storage apparatus 10 adapted to store and monitor the temperature of subject bodies 80 related to pharmaceutical or medical products such as vaccine bottles. The storage apparatus 10 is adapted to house the control device 200 in such a manner to be operatively connected to a plurality of temperature-sensing devices 100 positioned in physical contact with the subject bodies 80 stored inside the storage apparatus 10. Though the bodies 100 are shown to be vaccines stored in vaccine containers 80, such depiction should not be construed as any limitation to the present apparatus 10. Accordingly, the storage apparatus 10 may be adapted to detect the temperature of any subject body, such as other pharmaceutical products, food products, beverage products, microorganisms, sold test objects, or any other material, received in the apparatus 10.

Referring to FIGS. 2A-2B, in various embodiments of the invention, the temperature-sensing device 100 can be adapted to be used with various pharmaceutical products like vaccine bottles, medical solution container or carrier 80 (shown in FIG. 2A) and capsule 85 (shown in FIG. 2B). The device 100 can also be adapted to be in contact with living cells or micro-organisms to measure their temperature.

In an embodiment of the invention, the storage apparatus 10 comprises a container 40 and a cover 20. The cover 20 is adapted to close the container 40. Preferably, the cover 20 is adapted to close the container 40 in such a manner to preserve the temperature status quo inside the container 40. The storage apparatus 10 has an external body portion 12 which may be made of any suitable material including but not limited to bio-disposable bio-processing material, stainless steel, plastic, or any other durable polymeric material. The storage apparatus 10 further comprises a tray 60 having plurality of receptacles 45 adapted to receive the subject bodies 80. The control device 200 is preferably adapted to be coupled to an internal side 55 of the cover 20. In one embodiment, the temperature-sensing device 100 is adapted to be in physical contact with the subject bodies 80 placed within the tray 60. In this case, the control devices 100 are shown to be positioned inside the vaccine containers 80 containing the vaccines. In case the subject bodies 80 are solids, the control devices 100 may be placed in contact with the subject bodies 80 received within the receptacles 45 of the apparatus 10.

The temperature-sensing device 100, the control device 200 and the storage apparatus 10 will be explained more in detail according to one embodiment of the invention in the following sections.

The Temperature-Sensing Device (100):

In a preferred embodiment of the invention, the temperature-sensing device 100 is an IC 100 comprising a resonant receiver circuit 102, a rectifier and regulator circuit 104, a temperature sensor 106 and a relay circuit 108. Preferably the relay circuit 108 comprises an analog-digital converter (ADC) 112 and a load switching circuit 110. Preferably, the temperature sensor 106 is fully MOS ultra low power temperature sensor and the ADC 112 is a one bit ADC. For example, the ADC 112 can be a one bit sigma delta ADC.

The temperature-sensing device 100 is adapted to be in wireless resonant energy communication with the control device 200. The control device 200 comprises a resonant transmitter circuit 202. The resonant receiver circuit 102 tunes with the resonant transmitter circuit 200, which is constantly generating detection signals in the form of wireless resonant energy, to power itself and operate based on the received power.

The temperature-sensing device 100 is a self-powering chip which generates power by receiving the resonant power from the control device 200. The resonant receiver 102 receives the resonant wireless energy in the form of magnetic flux from the resonant coil 202 of the control device 200 and converts that flux into an electrical current using a coil within the resonant receiver 102.

The temperature-sensing device 100 further comprises a fully MOS-transistor temperature sensor 106 adapted to be operatively connected to the resonant receiver 102. The MOS-transistor temperature sensor 106 is adapted to be in physical contact with the subject body 80. The MOS-transistor sensor 106 is adapted to draw power from the resonant receiver circuit 102 for operation in the purpose of detecting temperature of the subject body 80.

The MOS-transistor temperature sensor 106 is a complementary metal-oxide-semiconductor (CMOS) based ultra-low power temperature sensor 106. In one embodiment of the invention, the MOS-transistor temperature sensor 106 has an outer layer comprising Silicon-di-oxide ($SiO_2$), which allows the CMOS based temperature sensor 106 to be immerse-able even in liquid subject bodies 80, such as vaccines, without risk of causing chemical reactions with the vaccines.

The temperature-sensing device 100 further comprises a relay circuit 108 adapted to be connected to the MOS-transistor temperature sensor 106 and to the resonant receiver 102 for receiving the detected temperature from the temperature sensor 106 and for sending the detected temperature to the receiver circuit 102 for transmission to the control device 200.

The relay circuit 108 comprises an ADC 112 operatively connected to a load switching circuit 110 for relaying the detected temperature data to the control device 200 via the resonant receiver circuit 102. The ADC 112 is preferably an ultra-low power high resolution 1-bit analog-to-digital converter 112 which is adapted to convert analog data received from the MOS temperature sensor 106 into binary (1 or 0) stream of digital data and sends the data to the load switching circuit 110. The load switching circuit 110 is further adapted to load the temperature data to the resonant receiver circuit 102.

In an embodiment of the invention, the resonant receiver circuit 102 is adapted to store the data representing the temperature measured in a memory (not shown) and send the data to the resonant reading circuit 202 via backscattering communication. In another embodiment, the data is transmitted immediately to the resonant reading circuit 202 without previous storage inside the temperature-sensing device 100. Further, the temperature-sensing device 100 may include a resonant-clocking based digital logic (not shown) to enable the aforesaid purpose.

In an embodiment of the invention, the temperature-sensing device 100 further comprises a rectification circuit 104 adapted to be connected to the resonant receiver 102 and the temperature sensor 106. The rectification circuit 104 is adapted to rectify and regulate the power derived from the resonant receiver circuit 102 in such a manner that the power relayed to the temperature sensor 106 is a regulated/rectified based on the requirements of the temperature sensor 106.

In an embodiment of the invention, the temperature-sensing device 100 has a chip area less than 0.5 millimeter square (mm2). The small size of the device 100 is of an important practical utility as it enables the device 100 to be used in a wide range of applications with bodies 80 having a wide range of sizes including very small sizes. The device 100 is adapted to operate with a wide temperature range.

The Control Device (200):

In a preferred embodiment of the invention, the control device 200 comprises a resonant transmitter circuit 202, a DC power supply 204, a data receive sense circuit 206 and a data display 208. The resonant transmitter circuit 202 is adapted to be connected to the DC power supply 204 for generating and sending interrogation signals in the form of radio frequency resonance to the temperature-sensing devices 100. The interrogation signals sent to the temperature-sensing devices 100 are captured by the resonant receiver 102. The resonant receiver 102 receives the interrogation signals and directs these to the rectifier/regulator 104 for rectification and regulation before being directed to the temperature sensor 106 providing thereto power for operation. The temperature sensor 106 is therefore powered non-intrusively (without any direct contact with a power supply) using the principle of resonant wireless energy transfer conducted between the resonant transmitter 202 and the resonant receiver 102.

The temperature sensor output drives the single 1-bit ADC 112 and the output of the ADC 112 is used to derive the load switching circuit 110 which in turn loads the receiver resonant circuit 102 with different loads based on the binary zero or one output. The receiver resonant circuit 102 sends the temperature loads (signals) to the resonant transmitter 202.

The resonant transmitter 202 is adapted to be connected to the data receive sense circuit 206 for interpreting the received temperature signals. The receive sense circuit 206 (also referred to as RF data receiver circuit 206) is adapted to be connected to the display 208 for receiving the detected temperature signals received from the temperature-sensing devices 100 and for processing the signals including interpreting the temperature data received and generating display signals for displaying the temperature on the display 208. The receive sense circuit 206 preferably comprises a microprocessor (not shown) for processing the signals. This being said, the different loading states of the resonant circuit 102 on the temperature-sensing devices 100 side are reflected on the resonant circuit 202 on the reading circuit 200 side (called backscattering) and the data receive sense circuit 206 receives the corresponding data which is actually the temperature of the sensor chip 106. The data is then decoded by the data receive sense circuit 206 and sent to the display 208.

In this sense, the data receive sense circuit 206 decodes the data and send the decoded data to the display 208 for displaying the detected temperature data. In an embodiment of the invention, the RF data receiver circuit 206 is adapted to use different encoding and spreading schemes based on the pre-programmed PN sequence to differentiate among the data coming from different temperature-sensing devices 100 in the different subject bodies 80 (for example the vaccines bottle). This allows temperature from multiple bodies 80 to be displayed simultaneously.

The Storage Apparatus (10):

In a preferred embodiment of the invention, the present apparatus 10 comprises an inbuilt refrigeration circuitry adapted to cool the apparatus 10 and a controller adapted to work on feedback control (based on the detected temperatures) for regulating the temperature of the apparatus 10. The apparatus 10 also comprises display receiving means such as an opening 15 adapted to receive the display 208 of the control device 200.

The storage apparatus 10 is adapted to be used for storing and monitoring the temperature of subject bodies 80 such as vaccines. The vaccines are kept inside the container 40 of the apparatus 10. Whenever the storage apparatus 10 is powered on, the control device 200 sends interrogation signals to the one or more temperature-sensing devices 100 in contact with the one or more subject bodies 80. The resonant receiver 102 receives the interrogation signals and generates power based on the principle of wireless energy transfer. Further, the resonant receiver circuit 102 sends the power to the rectifier and regulator unit 104 for rectification and regulation before the power is transmitted to the MOS temperature sensor 106.

The MOS temperature sensor 106 turns on after receiving the power and starts measuring the temperature of the subject body 80. After measuring the temperature, the MOS temperature sensor 106 sends the data to the analog to digital converter (ADC) 112 for converting the temperature data from analog to binary (1 or 0). The ADC 112 transmits the data to the resonant receiver circuit 102 via the load switching circuit 110. The load switching circuit 108 is adapted to load the data to the resonant receiver 102.

The resonant receiver 102 reflects the data signal to the resonant reader 200 via backscattering communication. After receiving the temperature data signal, the resonant transmitter 202 sends the data to the data receive sense circuit 206, which is adapted to decode the data by using different encoding and spreading/dispreading schemes based on pre-programmed PN sequence to differentiate among the data coming from different sensors from different subject bodies. After decoding the data, the data receive sense circuit 206 transmits the data to the data display 208, which displays the temperature values of each subject body 80 on the display 208.

The storage apparatus 10 is according to one embodiment of the invention is designed to be simple and easy to use. The temperature-sensing devices 100 can be implemented in connection with other control devices and/or storage devices because it is simple configuration makes it very compatible with other devices. The apparatus 10 can be used in delivery process of any temperature sensitive product in connection with which the temperature level needs to be monitored. The temperature-sensing devices 100 can be used in medical, hospital, home, education institute, food preservation, restaurant and the like related applications.

The temperature-sensing device 100 is self-powering and passive. The device 100 is designed to be of low power. Further, due to use of CMOS technology, the temperature-sensing device 100 used in the apparatus 10 is glass like, and can be easily dispersed in liquids, such as vaccines without causing in chemical reactions.

In an embodiment of the device, there is provided a system combining any of the aforementioned embodiments of the temperature-sensing device 100, the control device 200 and the storage apparatus 10 or any combination thereof.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

The invention claimed is:

1. A temperature-sensing device for measuring temperature of a subject body and relaying the measured temperature to a control device remote from the temperature-sensing device, the temperature-sensing device comprising:
   a resonant reading circuit adapted to generate resonant wireless power loads;
   a resonant receiver circuit adapted to receive resonant wireless power loads from the control device;
   a temperature sensor adapted to be operatively connected to the resonant receiver circuit for deriving power and for measuring the temperature of the subject body based on the resonant wireless power loads received; and a relay circuit adapted to be operatively connected to the temperature sensor and to the resonant receiver circuit for relaying the measured temperature to the control device via the resonant receiver circuit using wireless magnetic resonant energy transfer; wherein the resonant receiver circuit is magnetically connected to the resonant reading circuit for receiving the resonant wireless power loads.

2. The temperature-sensing device as claimed in claim 1, wherein the relay circuit comprises an analog to digital convertor and a load switching circuit for relaying the detected temperature to the control device.

3. The temperature-sensing device as claimed in claim 2, wherein the analog to digital converter is an ultra-low power high resolution 1-bit analog-to-digital converter.

4. The temperature-sensing device as claimed in claim 2, wherein the load switching circuit is adapted to load the resonant receiver circuit with different loads based on binary output of the analog-to-digital converter.

5. The temperature-sensing device as claimed in claim 1, wherein the temperature sensor is a complementary metal-oxide-semiconductor (CMOS) based temperature sensor.

6. The temperature-sensing device as claimed in claim 1 further comprising a rectification circuit which is adapted to rectify and regulate the power derived from the resonant receiver circuit and provide the rectified power to the temperature sensor.

7. The temperature-sensing device as claimed in claim 1, wherein the resonant receiver circuit comprises a resonant-clocking based digital logic and a memory.

8. The temperature-sensing device as claimed in claim 1, wherein the device is an IC device having an area of less than 0.5 mm2.

9. The temperature-sensing device as claimed in claim 1, wherein the MOS-transistor temperature sensor has an outer layer comprising SiO2.

10. A system for monitoring temperature of one or more subject bodies, the system comprising:
    a resonant reading circuit adapted to generate resonant wireless power loads;
    a resonant receiver circuit adapted to be magnetically connected to the resonant reading circuit for receiving the resonant wireless power loads and for generating power based on the power loads received;
    one or more temperature sensors adapted to be operatively connected to the resonant receiver circuit for deriving power and for measuring the temperatures of the one or more subject bodies respectively based on the resonant wireless power loads received; and
    a relay circuit adapted to be operatively connected to the one or more temperature sensors and to the resonant receiver circuit for relaying the measured temperatures to the resonant reading circuit via the resonant receiver circuit using wireless resonant energy transfer.

11. The system as claimed in claim 10 further comprising a data receive sense circuit connected to the resonant reading circuit for generating data based on the wireless resonant energy received at the resonant reading circuit from the resonant receiver circuit.

12. The system as claimed in claim 11 further comprising a display adapted to be connected to radio frequency data receiver circuit for displaying the measured temperatures.

13. The system as claimed in claim 12, wherein the measured temperatures are associated with each one of the one or more subject bodies such that each subject body has at least one measured temperature.

14. The system as claimed in claim 13 further comprising a DC power supply source adapted to be connected to the transceiver coil for powering transceiver coil.

15. The system as claimed in claim 14, wherein the relay circuit comprises an ADC convertor and a load switching circuit, the ADC converter being an ultra-low power high resolution 1-bit analog-to-digital converter, and the system further comprises a rectification circuit adapted to rectify and regulate the power derived from the resonant receiver circuit and provide the rectified power to the one or more temperature sensors.

16. The system as claimed in claim 10 wherein the resonant receiver circuit, the one or more temperature sensors and the relay circuit are part of one or more integrated circuits (ICs) adapted to be in physical contact with the ore or more subject bodies respectively.

17. The system as claimed in claim 16 wherein the device has an area of less than 0.5 mm2, the load switching circuit is adapted to load the resonant receiver circuit with different loads based on binary output of the ADC converter, and the temperature sensor is a CMOS based temperature sensor.

18. A storage apparatus comprising:
    a container adapted to store one or more pharmaceutical products;
    the temperature monitoring system as claimed in claim 10;
    a cover having an internal portion adapted to receive the resonant reading circuit in such a manner that it is in magnetically connected to the one or more temperature sensors;
    a display adapted to be coupled to the internal portion of the cover for displaying the one or more measured temperatures.

19. The storage apparatus as claimed in claim 18 wherein the pharmaceutical products are vaccine bottles.

20. The storage apparatus as claimed in claim 19 wherein the resonant receiver circuit, the one or more temperature sensors and the relay circuit are part of one or more ICs adapted to be positioned inside the vaccine bottles.

21. The temperature-sensing device as claimed in claim 1, wherein the temperature-sensing device is easily dispersed in liquids, to store and monitor temperature of subject bodies such as vaccines.

* * * * *